United States Patent [19]

Jacob et al.

[11] 4,334,569
[45] Jun. 15, 1982

[54] TRACTION ASSEMBLY

[75] Inventors: Richard J. Jacob, Dayton, Ohio; Jack D. White, Springfield; Kenneth D. Richmond, Nixa both of Mo.

[73] Assignee: Dayco Corporation, Dayton, Ohio

[21] Appl. No.: 197,421

[22] Filed: Oct. 16, 1980

Related U.S. Application Data

[63] Continuation-in-part of Ser. No. 63,878, Aug. 3, 1979, abandoned.

[51] Int. Cl.³ .............................................. B60C 27/00
[52] U.S. Cl. .................................. 152/221; 24/68 CT; 24/230 AK; 152/218; 152/237
[58] Field of Search ............... 152/221, 222, 237, 179, 152/191, 211, 170, 186, 178, 217, 218; 24/685 B, 68 CT, 170, 230 AK

[56] References Cited

U.S. PATENT DOCUMENTS

| 1,871,424 | 8/1932 | Olmstead | 152/221 |
| 2,267,242 | 12/1941 | Lutey | 152/221 |
| 2,782,494 | 2/1957 | Gordon | 152/221 X |
| 3,817,307 | 6/1972 | Detwiler | 152/226 |
| 3,837,986 | 9/1974 | Görter et al. | 156/125 X |
| 3,839,116 | 10/1974 | Thomas et al. | 156/138 |

FOREIGN PATENT DOCUMENTS 470076 8/1937 United Kingdom ............... 152/221

Primary Examiner—Edward C. Kimlin
Assistant Examiner—Thomas Bokan
Attorney, Agent, or Firm—Joseph V. Tassone

[57] ABSTRACT

A traction device which is adapted to be mounted on a tire is provided which comprises at least one ribbed strap. The strap is mounted with the ribs facing outwardly, and provides greater traction in snow.

2 Claims, 5 Drawing Figures

TRACTION ASSEMBLY

BACKGROUND OF THE INVENTION

This is a continuation-in-part of application Ser. No. 63,878, filed Aug. 3, 1979 now abandoned.

This invention relates to traction devices for motor vehicles.

Tire chains consisting of a plurality of cross strands of twisted link steel chain, all of which are fitted together into a harness arrangement which, when draped over a vehicle wheel, allows the cross strands to become fitted to the outer surface of the tire, are well known. Also known are the many disadvantages of using such tire chains. For example, among the disadvantages of using chains is the fact that they are difficult to apply and to remove while the tires are on the vehicle. Additionally, when running in normal engagement with a road surface, the chains cause noise, considerable vibration, damage to the road surface, and, possible damage to the tire and/or the vehicle.

Several anti-skid assemblies have been proposed wherein the link steel chain cross-strands are replaced, in whole or in part, by cross-strands made primarily of an elastomeric material. Examples of such assemblies are disclosed in the following U.S. Pat. Nos. 1,301,988, 1,871,424, 2,782,494 and 3,817,307. These assemblies have the common disadvantage that they are fitted together in a harness arrangement and are, therefore, difficult to apply and to remove.

Another anti-skid assembly is disclosed in U.S. Pat. No. 4,074,741 and comprises a single strand of link chain having fastening means fitted to each end, which is affixed to a tire through a wheel aperture. This assembly has the advantage that it is relatively easy to apply and to remove, but has the disadvantage that the link chain can cause noise, vibration, damage to the road surface, and possible damage to the tire or the vehicle.

It is, therefore, an object of the present invention to provide a traction device which will overcome the abovementioned disadvantages.

Other objects and advantages of the present invention will appear more clearly from the following specification, the appended claims and the attached drawing.

SUMMARY OF THE INVENTION

In accordance with the present invention there is provided a traction device adapted to be mounted on a tire mounted upon a wheel, the tire having a pair of opposed side walls and a peripheral road-contacting outer circumferential surface. The traction device of this invention comprises at least one strap, the strap being made primarily of an elastomeric material and comprising a strength section and an adjacent ribbed section defined by a plurality of longitudinally extending alternating projections and recesses. The strength section comprises a plurality of longitudinally extending strength members which are embedded in the elastomeric material. The device has means for detachably mounting the strap on the tire.

DESCRIPTON OF THE PREFERRED EMBODIMENT

Figure 1:
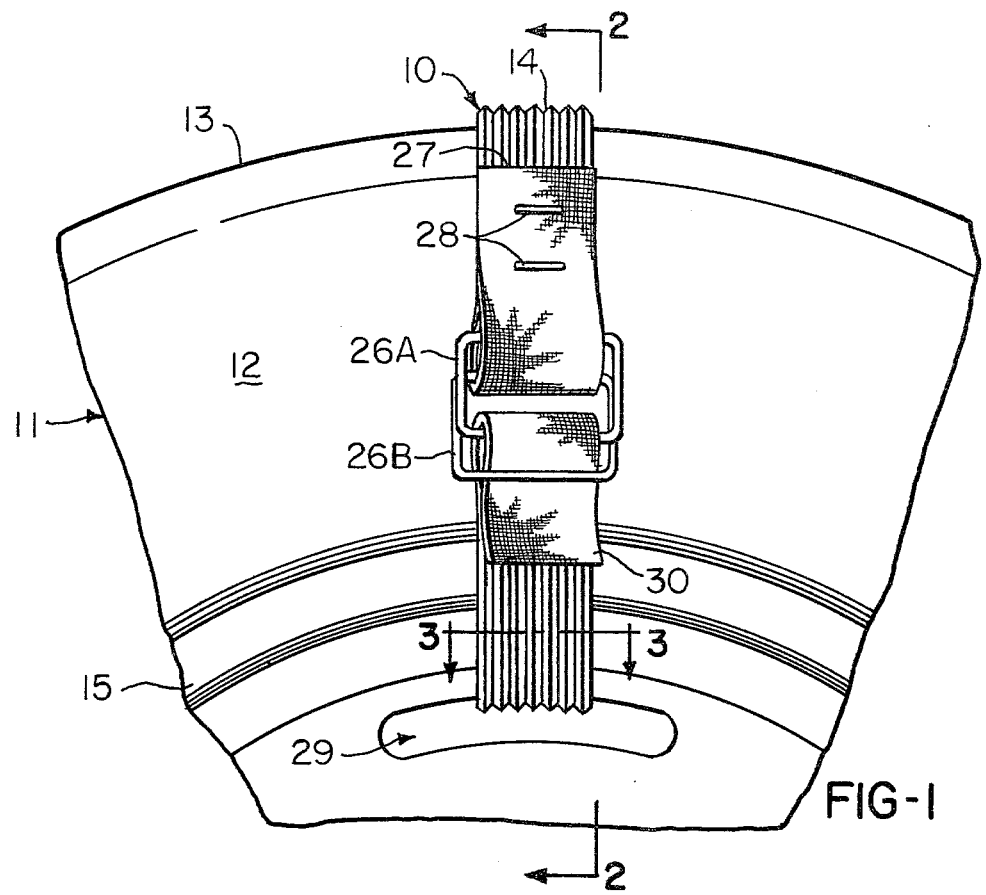
FIG. 1 is a partial side elevation view of one embodiment of the traction device of this invention mounted on a tire.
Figure 2:
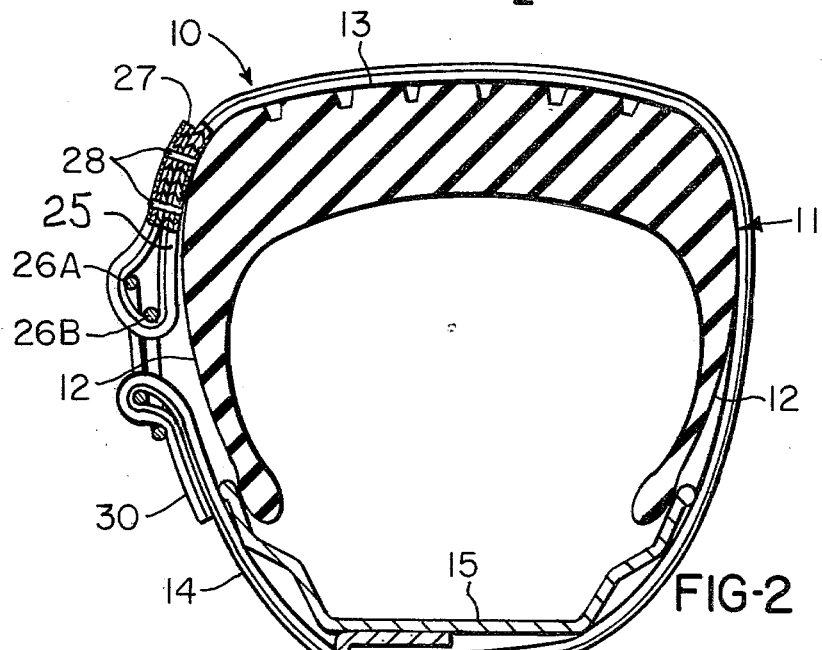
FIG. 2 is a sectional view taken along lines 2—2 of FIG. 1.
Figure 3:
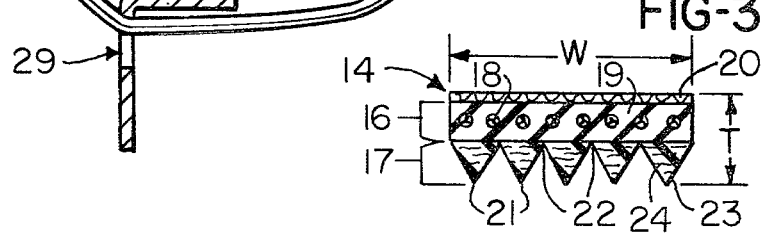
FIG. 3 is a sectional view taken along lines 3—3 of FIG. 1.

A traction device 10 of this invention is illustrated in one embodiment in FIGS. 1–3 of the drawing.

FIGS. 1 and 2 illustrate the device 10 mounted upon a conventional tire 11. The tire 11 may be any type of tire commonly utilized on a motor vehicle. The tire 11 has two opposing side walls 12 and an outer peripheral surface 13.

The traction device 10 comprises a strap 14, as shown in FIG. 3, having a width W greater than its thickness T and having a length sufficient to permit the strap 14 to extend around the tire 11 and the wheel rim 15.

The strap 14 is a one piece unitary body made primarily of an elastomeric material and comprises a strength section 16 and a ribbed section 17 adjacent the outer surface of the strength section. The strength section 16 comprises a single layer of strength cords 18 which extend generally in the lengthwise direction and for the entire length of the strap 14 and are embedded in an elastomeric material 19. The cords 18 may be of any high tensile strength material known in the art, such as polyester, nylon, aramid, or the like. The strength section 16 may also comprise a fabric layer 20 which may be impregnated with and/or bonded to the inner surface of the strength section. The ribbed section 17 is defined by a plurality of alternating ribs or projections 21 and recesses 22 which extend generally in the lengthwise direction and for the entire length of the strap 14. The ribbed section 17 is made of an elastomeric material 23 which may be the same or different from the elastomeric material 19. The elastomeric material 23 of the ribbed section 17 may also have a plurality of discrete fibers 24 dispersed homogeneously therethrough. At least 50 percent of the fibers 24 are oriented and the direction of fiber orientation lies at an angle in the range of 45° to 90° to the length direction of the strap 14, preferably 90° to the length direction. These fibers may be any fiber, natural or synthetic, such as cotton, nylon, rayon, polyester, aramid, brass, steel, or the like, including mixtures thereof. The amount of fibers 24 in the elastomer 23 can range from 1 to 50 parts by weight per 100 parts by weight of the elastomer, preferably about 10 to 40 parts.

Referring again to FIGS. 1 and 2, one end portion 25 of the strap 14 has connecting means 26 for detachably connecting the two end portions of the strap together. The connecting means illustrated includes two rings A and B, and in the drawing these rings are designated 26A and 26B. One end 27 of the strap is passed through the rings 26A and 26B and bent back upon the end portion 25 to form a closed loop, then fastened to the strap, as by staples 28 or other suitable fasteners, such as rivets.

The traction device 10 is fitted to the tire 11 by passing one end through one of the apertures 29 in the wheel and around the tire 11. The free end 30 of the strap 14 is passed through both of the rings 26A and 26B and looped back under the ring 26B, then pulled tight. As best shown in FIG. 1, the fabric layer 20 forms the tire-contacting surface, while the ribs 21 form the road-contacting surface of the strap.

Although increased traction, particularly in mud or loosely-packed snow, may be afforded by fitting only one traction device 10 to a tire 11, it is generally preferable to fit two to four, or more, of such devices at intervals around a given tire.

The strap 14 may be made utilizing any technique known in the art. A method which has been successfully used is disclosed in U.S. Pat. No. 3,839,116 which is incorporated herein by reference.

FIGS. 1 and 2 show the position of the traction device 10 as the tire 11 rotates with respect to the road. It should be noted that in the normal position the strap 14 lies flat against the tire 11 and, because the strap 14 is relatively thin, does not materially add to the circumferential surface of the tire at that point. Therefore, noise of the traction device and tire combination is kept at a minimum. It should also be noted that the strap 14, being at least partially deformable, can twist from the normal position to provide increased traction.

Figure 4:
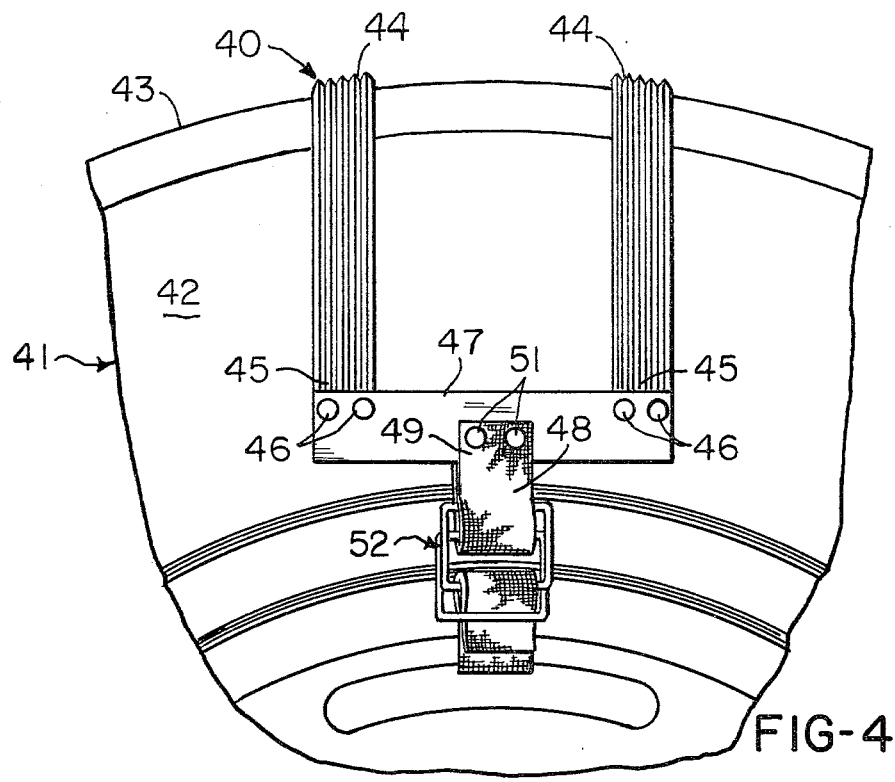
FIGS. 4 and 5 illustrate another embodiment of the traction device of this invention.
Figure 5:
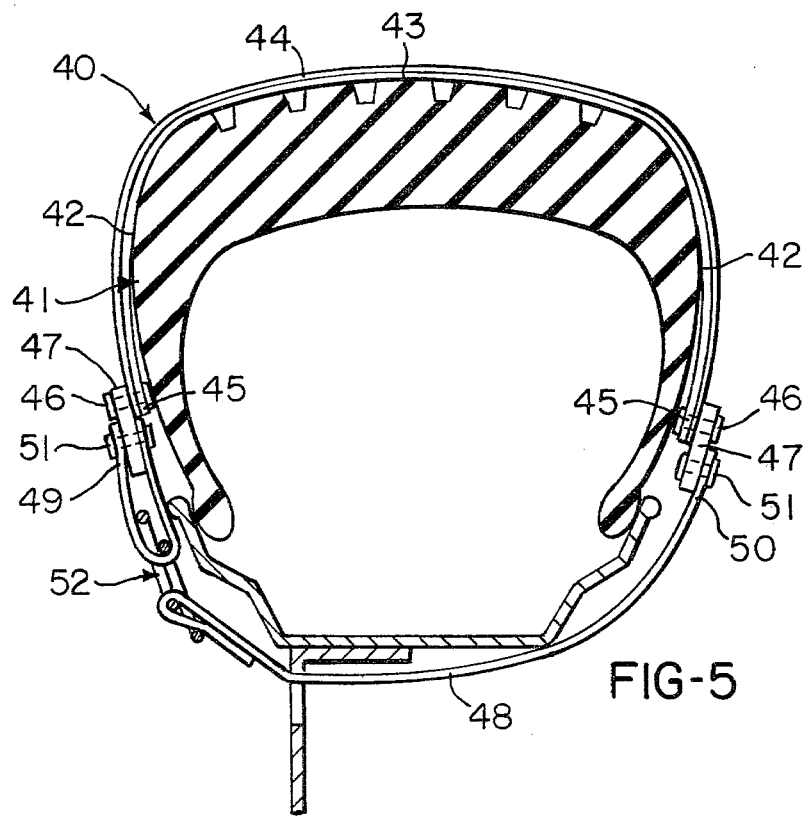

Another embodiment of the present invention is shown in FIGS. 4 and 5, and is designated generally by the reference numeral 40. The traction device 40 is shown mounted upon a conventional tire 41 which has two opposing side walls 42 and an outer peripheral surface 43. The traction device 40 comprises a pair of straps 44 which are made from the same material as the strap 14. The straps 44 have a length which is at least equal to the height of one sidewall 42 plus the transverse width of the surface 43. The ends 45 of the straps 44 are secured in suitable manner, such as by rivets 46 to a connecting bar 47 which may be made of any suitable material, such as metal or plastic. The assembly comprising the two straps 44 and the two connecting bars 47 is fitted around the tire 41 and secured thereto by a strip 48. The ends 49 and 50 of which are secured to the connecting bars 47 by rivets 51, or the like, and which has buckling means 52 for demountably securing the assembly to the tire 41.

Various modifications and embodiments of the present invention will be apparent to those skilled in the art in view of the foregoing disclosure.

We claim:

1. A traction device adapted to be mounted on a tire mounted on a wheel, said tire having a pair of opposed side walls and a peripheral road-contacting outer circumferential surface, which comprises a single strap having a width greater than its thickness extending around said tire and through an aperture in said wheel, and means for demountably connecting one end portion of said strap to the opposite end portion of said strap; said strap being composed of a one piece unitary body having an inner tire-contacting surface and an outer road-contacting surface, said body comprising a strength section having inner and outer surfaces, a ribbed section adjacent said outer surface, and a fabric layer adjacent said inner surface and forming said tire-contacting surface; said strength section primarily composed of elastomeric material and having a single layer of reinforcing cords embedded therein and extending generally in the lengthwise direction of and for the full length of said strap; said ribbed section defined by a plurality of alternating ribs and recesses extending generally in the lengthwise direction of and for the full length of said strap, said ribs forming said outer road-contacting surface and primarily composed of elastomeric material and having a plurality of discrete fibers dispersed homogeneously therein, at least 50 percent of said fibers being oriented at 90 degrees to the direction of length of said strap.

2. The traction device of claim 1 wherein said elastomeric material contains from 1 to about 50 parts of discrete fibers per 100 parts of elastomer.

* * * * *